US007137112B2

(12) United States Patent
Lovvik et al.

(10) Patent No.: US 7,137,112 B2
(45) Date of Patent: Nov. 14, 2006

(54) METHOD AND APPARATUS FOR DETERMINING CLASS DEPENDENCIES OF OBJECTS AND/OR CLASSES

(75) Inventors: Paul A. Lovvik, Boulder Creek, CA (US); Junaid A. Saiyed, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 739 days.

(21) Appl. No.: 09/996,126

(22) Filed: Nov. 27, 2001

(65) Prior Publication Data

US 2003/0037320 A1 Feb. 20, 2003

Related U.S. Application Data

(60) Provisional application No. 60/311,631, filed on Aug. 10, 2001.

(51) Int. Cl.
*G06F 9/44* (2006.01)
*G06F 9/45* (2006.01)
*G06F 9/46* (2006.01)

(52) U.S. Cl. .................... 717/166; 717/148; 718/106

(58) Field of Classification Search ................ 717/170, 717/166; 707/103 R; 711/145
See application file for complete search history.

(56) References Cited

U.S. PATENT DOCUMENTS 5,787,275 A * 7/1998 Li .......................... 707/103 R
6,442,753 B1 * 8/2002 Gerard et al. ............... 717/170

* cited by examiner

*Primary Examiner*—Wei Zhen
*Assistant Examiner*—Chih-Ching Chow

(74) *Attorney, Agent, or Firm*—Park, Vaughan & Fleming LLP

(57) ABSTRACT

One embodiment of the present invention provides a system that determines class dependencies of a class. The system operates by: receiving a representation of the class; creating a model of the class from the representation; analyzing the model to detect references to supporting classes; and creating a list of all dependent classes. For each supporting class found, the system recursively determines the dependencies of that class and adds them to the list. In a variation on this embodiment, the system identifies classes that an object depends on by: receiving a representation of an object; parsing the object to identify any classes on which the object depends; and analyzing and documenting the class dependencies of the object and all dependent classes.

24 Claims, 4 Drawing Sheets

CACHE: 210

| CLASS NAME<br>java.lang.String | Vector(class names required by key)<br>java.lang.Object; java.lang.Integer; |
|---|---|

FIG. 3

RESULT: 208

| CLASS NAME<br>java.lang.String | CLASS NAMES<br>java.lang.Object; java.lang.Integer; |
|---|---|

FIG. 4

METHOD AND APPARATUS FOR DETERMINING CLASS DEPENDENCIES OF OBJECTS AND/OR CLASSES

RELATED APPLICATION

This application hereby claims priority under 35 U.S.C. §119(e) to a Provisional Patent Application entitled, "Class Dependency Analyzer" filed Aug. 10, 2001 by inventors Paul A. Lovvik and Junaid A. Saiyed (Application No. 60/311,631).

BACKGROUND

1. Field of the Invention

The present invention relates to computer systems and software. More specifically, the present invention relates to a method and an apparatus for determining the dependent classes of objects and/or classes.

2. Related Art

The advent of object-oriented programming and just-in-time compilers has brought about many changes in the way in which applications are written and distributed. Traditionally, applications are compiled for specific operating systems, and a copy must be distributed for every platform on which the application will run. With modern platform-independent languages, instead of compiling the source code, the source code is distributed and is compiled on the end machine at the time of use. This practice has many advantages with the biggest being true platform independence. Write your application once and it can be run on virtually any machine.

Object-oriented programming further revolutionized the software industry by organizing code into classes and objects, which reduced distribution sizes and further promoted reusing code. One programmer can borrow a class or an object from another programmer to add functionality to an application. Upon distribution of an application, all of the classes referenced by that application must be distributed with the application if the client system does not already contain a copy of the classes. In addition, classes can contain references to other classes which must also be included for the application to work properly.

As a direct result of this type of programming, several major problems have been created. First, in order to support application delivery over the Internet, programmers are looking to compact the size of their distribution files to reduce download times, and in turn, heighten customer satisfaction. Many programmers accomplish this by running the application on a machine with just the core classes installed and adding the necessary classes as the application reports that these classes are not found. This is very time consuming, and is not all-inclusive. If a certain part of the application is not invoked, or the system contained more than just the core classes, it is possible that some critical classes might be missed. Some programmers simply add all of the class files that are on their machine. This leads to extremely large and unnecessary distributions.

This problem is further compounded by the fact that classes can contain references to other classes, which in turn can contain references to yet more classes, and so forth. Even if you were to document every class that is directly referenced by an application as it was being developed, you would almost certainly be missing classes critical for the execution of the application. Because of their referential nature, it becomes extremely difficult to create a list of all the classes necessary, but only the classes necessary, for an application to execute.

Simple object databases can be constructed by serializing the database objects into an indexed data file. These objects can be reconstituted by deserializing that data only if all of the supporting classes for that data are accessible. Such a database that is shared between multiple applications (a system-wide object registry, for example) can be corrupted by a client application that inserts a new object into the shared database that references a class that is not commonly available. When the object is deserialized within an application that does not have access to the classes required to reconstitute that object, a ClassNotFound type of exception or error is generated.

What is needed is a method and an apparatus for efficiently determining the dependent classes of an object and/or a class.

SUMMARY

One embodiment of the present invention provides a system that determines class dependencies of a class. The system operates by: receiving a representation of the class; creating a model of the class from the representation; analyzing the model to detect references to supporting classes; and creating a list of all dependent classes. For each supporting class found, the system recursively determines the dependencies of that class and adds them to the list.

In one embodiment of the present invention, the system identifies classes that an object depends on by: receiving a representation of an object; serializing the referenced object; parsing the data resulting from the object serialization to identify classes referenced from the target object's properties, configuration, or state; and analyzing and documenting the class dependencies of the object and all dependent classes.

In one embodiment of the present invention, the system saves the list of dependent classes to a storage structure.

In one embodiment of the present invention, the system saves the list of dependent classes to a hash table or a database.

In one embodiment of the present invention, the system creates a distribution list or a distribution file that facilitates the distribution of a program.

In one embodiment of the present invention, the system inserts an object into an object database. Upon insertion into the database, the system determines if all of the dependent classes are present in the class path of the system containing the database. If any classes are not present, the system copies them into the class path.

In one embodiment of the present invention, the system filters the list of dependent classes to remove all duplicate and core classes.

In one embodiment of the present invention, the system saves the list of all dependent classes to cache to facilitate subsequent determinations of dependent classes.

BRIEF DESCRIPTION OF THE FIGURES

FIG. 3 illustrates the cache saved within the class dependency analyzer for a class in accordance with an embodiment of the present invention.

FIG. 4 illustrates the results returned by the class dependency analyzer for a class in accordance with an embodiment of the present invention.

Table 1 is an example interface for the class dependency analyzer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System with a Class Dependency Analyzer

Figure 1:
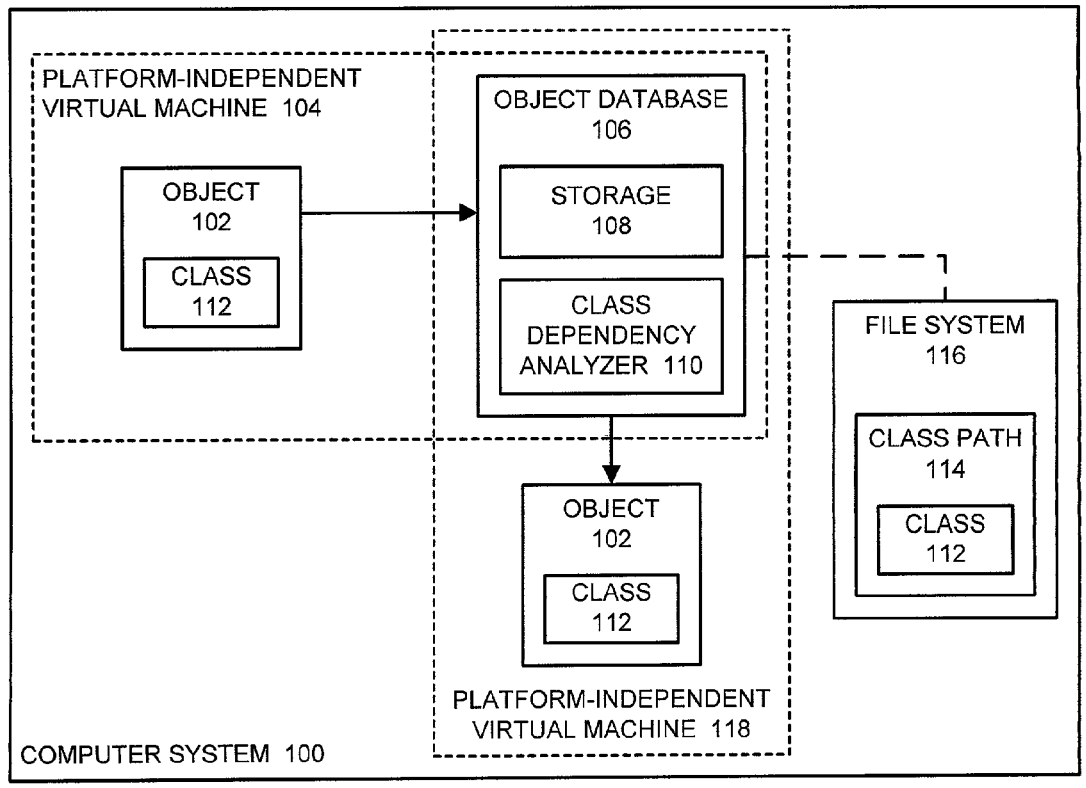
FIG. 1 illustrates a computer system with a class dependency analyzer in accordance with an embodiment of the present invention.

FIG. 1 illustrates a computer system with a class dependency analyzer in accordance with an embodiment of the present invention. Computer system 100 contains object 102 which exists inside of platform-independent virtual machine 104. Computer system 100 can generally include any type of computer system, including, but not limited to, a computer system based on a microprocessor, a mainframe computer, a digital signal processor, a portable computing device, a personal organizer, a device controller, and a computational engine within an appliance.

Platform-independent virtual machine 104 also contains object database 106. Object database 106 can include any type of system for storing objects in non-volatile storage. This includes, but is not limited to, systems based upon magnetic, optical, and magneto-optical storage devices, as well as storage devices based on flash memory and/or battery-backed up memory.

Platform-independent virtual machine 104 adds object 102 to object database 106. Object database 106 includes storage 108 and class dependency analyzer 110. Upon the insertion of a new object into storage 108 in object database 106, class dependency analyzer 110 analyzes object 102 for references to classes on which object 102 depends. If a class is discovered, in this case class 112, class dependency analyzer 110 analyzes the discovered class 112 for references to classes on which class 112 depends. This process continues until no more classes are discovered. Upon completion, class dependency analyzer 110 checks class path 114, which resides in file system 116, for the presence of all of the classes detected when analyzing object 102. If the classes that were detected when analyzing object 102 are not present in class path 114, class dependency analyzer 110 adds the classes to class path 114.

Figure 2:
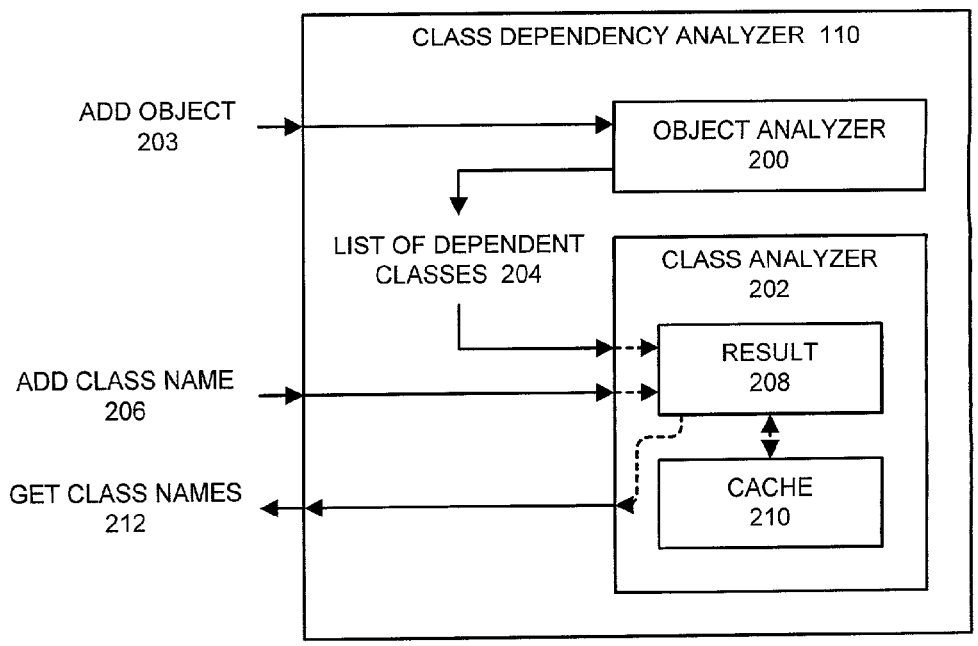
FIG. 2 illustrates the class dependency analyzer in accordance with an embodiment of the present invention.

Platform-independent virtual machine 104 and platform-independent virtual machine 118 can be included wholly inside of computer system 100 or can span multiple computer systems. Platform-independent virtual machine 118 retrieves object 102 from storage 108 within object database 106. Class dependency analyzer 110 analyzes object 102 for any class dependencies and retrieves them from class path 114 if necessary Class Dependency Analyzer FIG. 2 illustrates the class dependency analyzer in accordance with an embodiment of the present invention. Class dependency analyzer 110 contains object analyzer 200 and class analyzer 202. When the add object process 203 is invoked, a representation of the object is sent to object analyzer 200. Object analyzer 200 analyzes the object and determines all of the classes that the object references. Object Analyzer 200 then passes the list of dependent classes 204 to class analyzer 202.

Class analyzer 202 takes the list of dependent classes 204 from object analyzer 200 as well as any class names passed in directly from the add class name process 206. Class analyzer 202 analyzes the classes one at a time by checking cache 210 to see if the class has been analyzed previously, and if not, analyzing a representation of the class for dependent classes. Once the representation has been analyzed, the list of dependent classes including the name of the analyzed class is stored in result 208, as well as in cache 210 for subsequent lookups. The resulting list of dependent classes is returned via the get class names process 212.

An example interface for class dependency analyzer 110 is as follows:

TABLE 1

| ClassDependencyAnalyzer |
|---|
| public void setClassnameFilter (ClassnameFilter filter); <br> public void reset ( ); <br> public void addObject (Object o); <br> public void addClassname (String classname); <br> public Enumeration getClassnames ( ); |

Cache Saved within the Class Dependency Analyzer

FIG. 3 illustrates the cache saved within the class dependency analyzer for a class in accordance with an embodiment of the present invention. Cache 210 contains a set of class names with lists of all of the dependent classes for the specified class as were determined in prior analysis by the class dependency analyzer. In this embodiment of the present invention, the cache is saved in a hash table where the class name is used as a key to lookup the resulting list of dependent classes.

Results Returned by the Class Dependency Analyzer

FIG. 4 illustrates the results returned by the class dependency analyzer for a class in accordance with an embodiment of the present invention. Result 208 contains the name of the class analyzed and a list of all of the dependent classes discovered for the analyzed class. In this embodiment of the present invention, along with cache 210 illustrated in FIG. 3, the analyzed class name is of class java.lang.String. A subset of the resulting dependent classes includes java.lang.Object and java.lang.Integer. (The term JAVA™ is a trademark of SUN Microsystems, Inc. of Palo Alto, Calif.)

Process of the Class Dependency Analyzer

Figure 5:
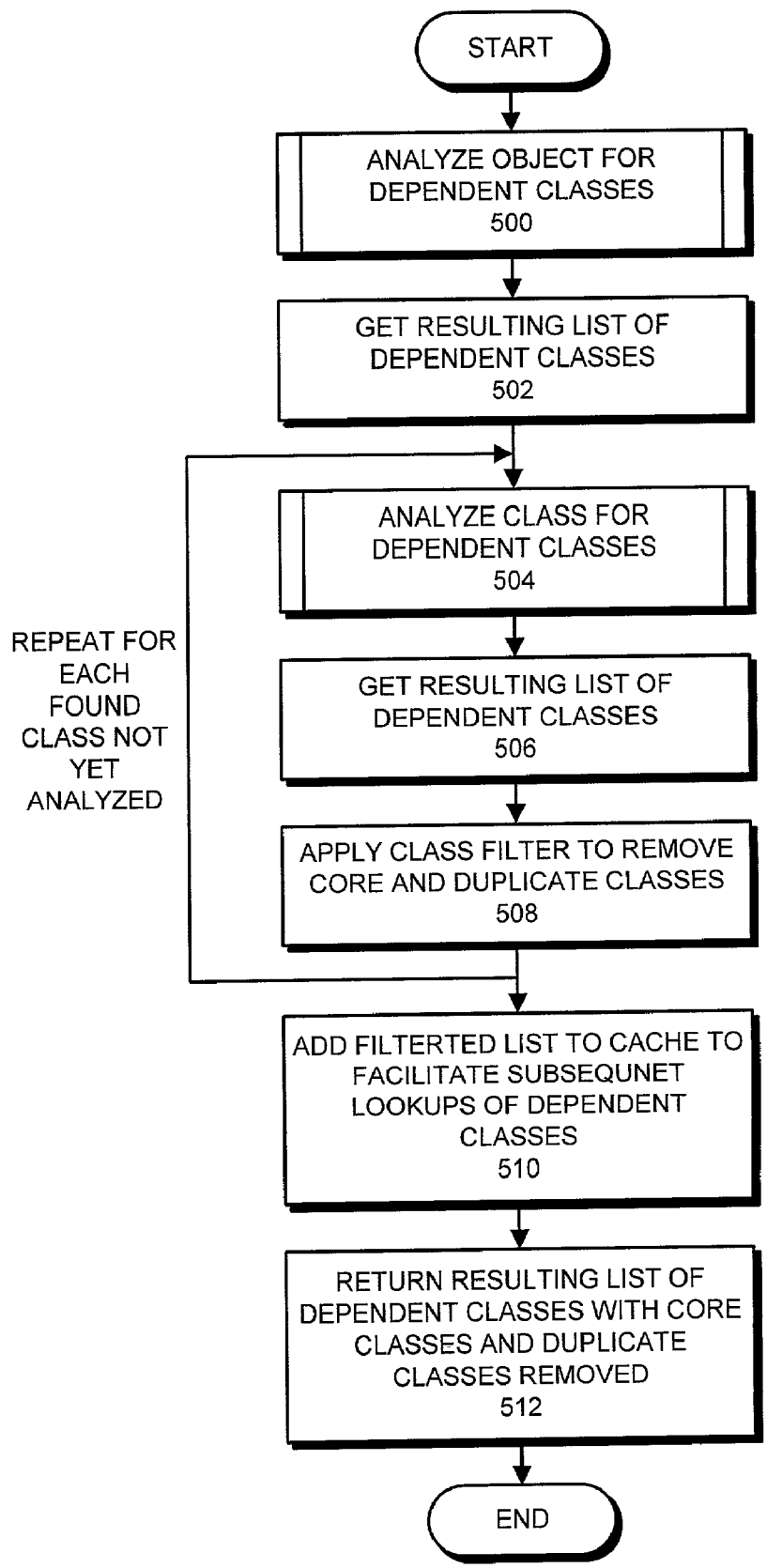
FIG. 5 is a flowchart illustrating the process of using the class dependency analyzer to determine the dependencies of a collection of objects and classes in accordance with an embodiment of the present invention.

FIG. 5 is a flowchart illustrating the process of using the class dependency analyzer 110 to determine the dependencies of a collection of objects and classes in accordance with an embodiment of the present invention. Class dependency analyzer 110 starts by analyzing supplied objects for dependent classes (step 500). Upon completion of the object analysis process, class dependency analyzer 110 retrieves the resulting list of dependent classes from the object analysis process (step 502), as well as any additional supplied classes, and analyzes the classes for dependent classes (step 504). As the classes are analyzed, class dependency analyzer 110 gets the resulting list of dependent classes 204 (step 506) and applies a filter to remove duplicate classes and core classes (step 508). Steps 504–508 are repeated for each found class not yet analyzed until all classes all classes are analyzed.

After all classes have been analyzed, the filtered list is added to cache 210 to facilitate subsequent lookups of dependent classes (step 510). The resulting list of dependent classes with duplicate classes and core classes removed is then returned by class dependency analyzer 110 (step 512).

Process of Analyzing an Object for Dependent Classes

Figure 6:
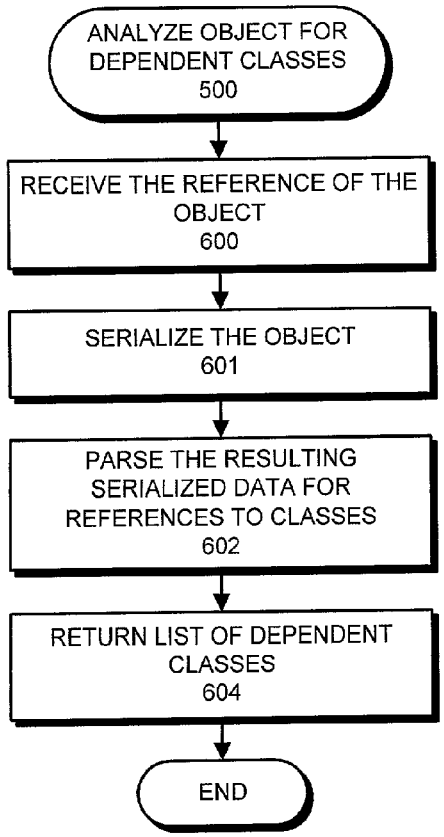
FIG. 6 is a flowchart illustrating the process of analyzing an object for dependent classes in accordance with an embodiment of the present invention.

FIG. 6 is a flowchart illustrating the process of analyzing an object for dependent classes in accordance with an embodiment of the present invention. The process of analyzing an object for dependent classes (step 500) starts by receiving a reference of the object (step 600). Next, the object is serialized (step 601), and the resulting data is parsed for references to classes (step 602). Note that given any object with any configuration in which various properties have been set into the object or the object has been put into a particular state, you are able to deduce only from the object's reference which classes are required to support that object. Finally, the list of classes is returned to the caller (step 604).

Process of Analyzing a Class for Dependent Classes

Figure 7:
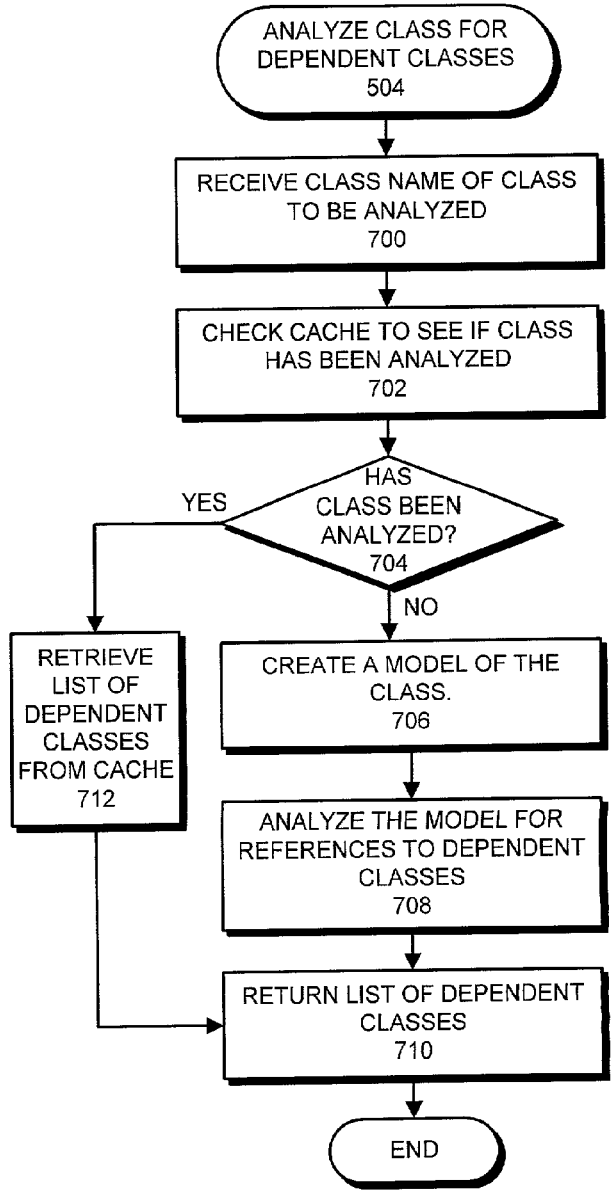
FIG. 7 is a flowchart illustrating the process of analyzing a class for dependent classes in accordance with an embodiment of the present invention.

FIG. 7 is a flowchart illustrating the process of analyzing a class for dependent classes in accordance with an embodiment of the present invention. The process of analyzing a class for dependent classes (step 504) starts by receiving the name of a class to be analyzed (step 700). Next, the system checks cache to see if the class has been analyzed previously (step 702). If the class has been analyzed, the system retrieves the list of dependent classes from cache (step 712). If the class has not been analyzed, the system creates a model of the class (step 706) and analyzes the model for references to dependent classes (step 708). The system then returns the list of dependent classes to the caller (step 710).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a class dependency that identifies a supporting class on which a target class depends, wherein the target class is defined in an object-oriented programming language, comprising:
   receiving a representation of the target class at a first platform-independent virtual machine;
   creating a model of the target class from the representation;
   analyzing the model within a class dependency analyzing to detect references to the supporting class;
   if a supporting class is detected, determining a class dependency for the supporting class;
   creating a list of dependent classes for the target class and supporting classes;
   sharing the list of dependent classes with a second platform-independent virtual machine so that the second platform-independent virtual machine does not need to create the list of dependent classes; and
   saving the list of dependent classes of the target class as well as the list of dependent classes of the supporting classes in a cache within the class dependency analyzer which stores class dependency information to facilitate subsequent lookups of dependent classes of the target class.

2. The method of claim 1, further comprising, identifying classes that an object depends upon by:
   receiving a representation of the object;
   serializing the referenced object;
   parsing the data resulting from the object serialization to identity classes referenced from the target object's properties, configuration, or state; and
   determining the dependent classes of the referenced object.

3. The method of claim 1, further comprising saving the list of dependent classes to a storage structure.

4. The method of claim 3, wherein the storage structure is one of a hash table and a database.

5. The method of claim 1, wherein creating the list of dependent classes includes creating one of a distribution list and a distribution file.

6. The method of claim 2, further comprising:
   inserting the object into an object database;
   determining if the target class and supporting classes for the target class are in the class path; and
   adding the target class and supporting classes for the target class to the class path if necessary.

7. The method of claim 2, further comprising:
   retrieving the object from the object database;
   determining if the target class and supporting classes for the target class are in the class path; and
   adding the target class and supporting classes for the target class to the class path if necessary.

8. The method of claim 1, further comprising filtering the list of identified classes to remove duplicate and core class references.

9. A computer-readable storage medium storing instructions that when executed by a computer cause the computer to perform a method for determining a class dependency that identifies a supporting class on which a target class depends, wherein the target class is defined in an object-oriented programming language, the method comprising:
   receiving a representation of the target class at a first platform-independent virtual machine;
   creating a model of the target class from the representation;

analyzing the model within a class dependecy analyzer to detect references to the supporting class;
if a supporting class is detected, determining a class dependency for the supporting class;
creating a list of dependent classes for the target class and supporting classes;
sharing the list of dependent classes with a second platform-independent virtual machine so that the second platform-independent virtual machine does not need to create the list of dependent classes; and
saving the list of dependent classes of the target class as well as the list of dependent classes of the supporting classes in a cache within the class dependecy analyzer which stores class dependency information to facilitate subsequent lookups of dependent classes of the target class.

10. The computer-readable storage medium of claim 9, wherein the method further comprises, identifying classes that an object depends upon by:
receiving a representation of the object;
serializing the referenced object;
parsing the data resulting from the object serialization to identify classes referenced from the target object's properties, configuration, or state; and
if a target class is identified, determining the dependent classes of the target class.

11. The computer-readable storage medium of claim 9, wherein the method further comprises saving the list of dependent classes to a storage structure.

12. The computer-readable storage medium of claim 11, wherein the storage structure is one of a hash table and a database.

13. The computer-readable storage medium of claim 9, wherein creating the list of dependent classes includes creating one of a distribution list and a distribution file.

14. The computer-readable storage medium of claim 10, wherein the method further comprises:
inserting the object into an object database;
determining if the target class and supporting classes for the target class are in the class path; and
adding the target class and supporting classes for the target class to the class path if necessary.

15. The computer-readable storage medium of claim 10, wherein the method further comprises:
retrieving the object from the object database;
determining if the target class and supporting classes for the target class are in the class path; and
adding the target class and supporting classes for the target class to the class path if necessary.

16. The computer-readable storage medium of claim 9, wherein the method further comprises filtering the list of identified classes to remove duplicate and core class references.

17. A computer apparatus that determines a class dependency that identifies a supporting class on which a target class depends, wherein the target class is defined in an object-oriented programming language, comprising:
a receiving mechanism that is configured to receive a representation of the target class at a first platform-independent virtual machine;
a modeling mechanism that is configured to create a model of the target class from the representation;
a class dependency analyzer;
an analysis mechanism within the class dependency analyzer that is configured to analyze the model to detect references to the supporting class;
a supporting mechanism that is configured to determine a class dependency for the supporting class;
a listing mechanism that is configured to create a list of dependent classes for the target class and supporting classes;
a sharing mechanism that is configured to share the list of dependent classes with a second platform-independent virtual machine so that the second platform-independent virtual machine does not need to create the list of dependent classes;
a cache within the class dependency analyzer configured to store class dependency information; and
a saving mechanism configured to save the list of dependent classes of the target class as well as the list of dependent classes of the supporting classes in the cache to facilitate subsequent lookups of dependent classes of the target class.

18. The computer apparatus of claim 17, wherein the receiving mechanism is additionally configured to receive a representation of an object;
a serializing mechanism is configured to serialize the referenced object;
a parsing mechanism configured to parse the data resulting from the object serialization to identify classes referenced from the target object's properties, configuration, or state; and
a supporting mechanism that is configured to determine the dependent classes of the target class.

19. The computer apparatus of claim 17, wherein the listing mechanism is configured to save the list of dependent classes to a storage structure.

20. The computer apparatus of claim 19, wherein the storage structure is one of a hash table and a database.

21. The computer apparatus of claim 17, wherein the listing mechanism is configured to create the list of dependent classes, including creating one of a distribution list and a distribution file.

22. The computer apparatus of claim 18, further comprising:
an insertion mechanism configured to insert the object into an object database;
a determining mechanism configured to determine if the target class and supporting classes for the target class are in the class path; and
an adding mechanism configured to add the target class and supporting classes for the target class to the class path if necessary.

23. The computer apparatus of claim 18, further comprising:
a retrieving mechanism configured to retrieve the object from an object database;
a determining mechanism configured to determine if the target class and supporting classes for the target class are in the class path; and
an adding mechanism configured to add the target class and supporting classes for the target class to the class path if necessary.

24. The computer apparatus of claim 17, further comprising a filtering mechanism configured to filter the list of identified classes to remove duplicate and core class references.

* * * * *